United States Patent
Roos et al.

(10) Patent No.: US 9,637,124 B2
(45) Date of Patent: May 2, 2017

(54) METHOD FOR CONTROLLING AN ACTUAL SPEED OF A VEHICLE

(71) Applicant: Scania CV AB, Södertälje (SE)

(72) Inventors: Fredrik Roos, Segeltorp (SE); Martin Evaldsson, Nacka (SE)

(73) Assignee: SCANIA CV AB, Södertälje (SE)

( * ) Notice: Subject to any disclaimer, the term of this patent is extended or adjusted under 35 U.S.C. 154(b) by 0 days.

(21) Appl. No.: 14/771,397

(22) PCT Filed: Feb. 20, 2014

(86) PCT No.: PCT/SE2014/050207
§ 371 (c)(1),
(2) Date: Aug. 28, 2015

(87) PCT Pub. No.: WO2014/148973
PCT Pub. Date: Sep. 25, 2014

(65) Prior Publication Data
US 2016/0009278 A1    Jan. 14, 2016

(30) Foreign Application Priority Data
Mar. 21, 2013    (SE) ........................................ 1350351

(51) Int. Cl.
*B60T 8/32*    (2006.01)
*B60W 30/14*    (2006.01)
*B60W 30/18*    (2012.01)

(52) U.S. Cl.
CPC ........ *B60W 30/146* (2013.01); *B60W 30/143* (2013.01); *B60W 30/18072* (2013.01);
(Continued)

(58) Field of Classification Search
CPC .... B60W 10/023; B60W 10/04; B60W 30/00; B60W 30/06; B60W 40/105; B60W 2710/081; B60W 2710/082
(Continued)

(56) References Cited

U.S. PATENT DOCUMENTS 4,419,729 A * 12/1983 Krieder .................. B60K 26/04
123/352
2005/0269874 A1* 12/2005 Ishimoto ............... B60T 8/1755
303/146

(Continued)

FOREIGN PATENT DOCUMENTS

| CN | 202278985 U | 6/2012 |
| EP | 1188598 A2 | 3/2002 |
| WO | WO-2011/126430 A1 | 10/2011 |

OTHER PUBLICATIONS

International Search Report for PCT/SE2014/050207 Jul. 16, 2014.

*Primary Examiner* — Muhammad Shafi
(74) *Attorney, Agent, or Firm* — Moore & Van Allen PLLC; W. Kevin Ransom

(57) ABSTRACT

The present invention provides a system for the control of an actual speed for a vehicle, wherein the system is arranged to be able to carry out the control based on a manual control of the actual speed or based on an automatic control of the actual speed. According to the present invention, an automatic control device is arranged to permit that the automatic control may actively control the actual speed to a higher value than a manual control device is arranged to permit the manual control to actively control the actual speed to.

20 Claims, 5 Drawing Sheets

(52) U.S. Cl.
CPC ... *B60W 2550/14* (2013.01); *B60W 2550/142* (2013.01); *B60W 2550/146* (2013.01); *B60W 2550/20* (2013.01); *B60W 2550/22* (2013.01); *B60W 2550/402* (2013.01)

(58) Field of Classification Search
USPC .......................................... 701/93, 400–541
See application file for complete search history.

(56) References Cited

U.S. PATENT DOCUMENTS

| | | | | |
|---|---|---|---|---|
| 2008/0189021 A1* | 8/2008 | Inoue | ................. | B60K 31/047 |
| | | | | 701/93 |
| 2012/0215416 A1* | 8/2012 | Poulin | ................ | B60W 30/146 |
| | | | | 701/93 |
| 2013/0085036 A1* | 4/2013 | Anderson | ............ | B60W 10/06 |
| | | | | 477/110 |

* cited by examiner

METHOD FOR CONTROLLING AN ACTUAL SPEED OF A VEHICLE

CROSS-REFERENCE TO RELATED APPLICATIONS

This application is a national stage application (filed under 35 §U.S.C. 371) of PCT/SE2014/050207, filed Feb. 20, 2014 of the same title, which, in turn, claims priority to Swedish Application No. 1350351-1, filed Mar. 21, 2013 of the same title; the contents of each of which are hereby incorporated by reference.

FIELD OF THE INVENTION

The present invention pertains to a system, method, and computer program product for the control of an actual speed $v_{act}$ for a vehicle.

BACKGROUND OF THE INVENTION

The following background description constitutes a description of the background to the present invention, which does not, however, necessarily constitute prior art.

For motor vehicles, such as cars, trucks and buses, the cost of fuel constitutes a significant expense for the owner or user of the vehicle. For a hauling company, for example, the main expenditure items for the day to day operation of a vehicle consist, apart from the cost of acquisition of the vehicle, of the vehicle driver's salary, costs of repair and maintenance, and fuel for driving the vehicle. The fuel cost may impact the profitability for the hauling company to a great extent. Therefore, a number of different systems have been developed to reduce fuel consumption, such as fuel-efficient engines and fuel-economical cruise controls.

One objective of cruise control systems is to achieve an even, predetermined speed. This is either achieved by adjusting the engine torque in order to avoid retardation, or by application of braking action on downhill slopes where the vehicle accelerates by virtue of its own weight. An overall objective of the cruise control is to achieve a comfortable drive and increased comfort for the driver of the motor vehicle.

A driver of a motor vehicle with a cruise control usually selects a set speed $v_{set}$. The set speed $v_{set}$ is the speed which the driver wishes the motor vehicle to maintain on a level road. The cruise control then provides the engine system in the vehicle with a reference speed $v_{ref}$, where the reference speed $v_{ref}$ is used to control the engine. The set speed $v_{set}$ may thus be seen as an input signal to the cruise control, while the reference speed $v_{ref}$ may be seen as an output signal from the cruise control, which is used to control the engine, providing control of the vehicle's actual speed $v_{act}$.

Traditional cruise controls (Cruise Control; CC) maintain a constant reference speed $v_{ref}$, which corresponds to the set speed $v_{set}$ set by the driver. The value of the reference speed $v_{ref}$ is here changed only when the user himself adjusts the set speed $v_{set}$ while driving.

Today there are also cruise controls, so-called economical cruise controls, such as Ecocruise controls and similar cruise controls, which try to estimate the current driving resistance and also have knowledge about the historical driving resistance. An experienced driver who drives a motor vehicle without a cruise control may reduce fuel consumption by adjusting his driving to the characteristics of the road ahead, so that unnecessary braking and/or fuel-consuming acceleration may be avoided. In a further development of these economical cruise controls, the ambition is to mimic the experienced driver's adjustment of driving the motor vehicle based on knowledge about the road ahead, so that fuel consumption may be kept at as low a level as possible, since this impacts the profitability for the owner of the motor vehicle, such as a haulage company or similar, to a great extent.

One example of such a further development of an economical cruise control is a "Look Ahead" cruise control (LACC), i.e. a strategic cruise control using knowledge about road sections ahead, i.e. knowledge about the appearance of the road ahead, in order to determine the appearance of the reference speed $v_{ref}$. Here, the reference speed $v_{ref}$ is thus permitted, within a speed interval $v_{min}$-$v_{max}$, to differ from the set speed selected by the driver $v_{set}$ in order to achieve more fuel-efficient driving.

Knowledge about the road section ahead may consist of knowledge about prevailing topography, curvature, traffic situation, road works, traffic intensity and road condition. Further, the knowledge may consist of a speed limit for the road section ahead, and/or of a road sign in connection with the road. These pieces of knowledge may be obtained through positioning information, such as GPS information (Global Positioning System information), map information and/or topographical map information, weather reports, information communicated between different vehicles and information communicated via radio. This knowledge may be used in many ways. For example, knowledge about a future speed limit for the road may be used to achieve fuel-efficient reductions of speed before a future lower speed limit. Similarly, knowledge about a road sign, with information about e.g. a future roundabout or junction, may also be used to brake in a fuel efficient manner before the roundabout or junction. By basing cruise control on positioning information combined with topographical map information, wrong decisions, depending on a driver's inaccurate judgement about a road gradient, may be avoided.

A LACC cruise control may allow increasing a reference speed $v_{ref}$ before a steep uphill slope to a level which is above the level for the set speed $v_{set}$, since the motor vehicle is expected to lose speed on the steep uphill slope, due to a high train weight in relation to the vehicle's engine performance. This means that time is saved, meaning that the LACC cruise control may be seen as a cruise control improving driveability. Similarly, the LACC cruise control allows the reference speed $v_{ref}$ to be reduced to a level which is below the set speed $v_{set}$ before a steep downhill slope, since the motor vehicle is expected to accelerate on the steep downhill slope due to the high train weight. The idea here is, that it is more fuel-economical to use the motor vehicle's acceleration due to its own weight on the downhill slope, than to first accelerate before the downhill slope and then brake down the hill. The LACC cruise control may thus reduce fuel consumption with a substantially unchanged driving time.

There are also cruise controls which, based on a current driving resistance, decide how the motor vehicle's speed should vary. In these cruise controls the reference speed $v_{ref}$ may be allowed to diverge from the set speed $v_{set}$, within a speed interval $v_{min}$-$v_{max}$, based on at least one characteristic of the driving resistance, such as its size and/or appearance over time.

There are also cruise controls which use radar and/or cameras to obtain information about vehicles ahead. Based on this information, the cruise control may control the vehicle's actual speed $v_{act}$, within a speed interval $v_{min}$-$v_{max}$, so that e.g. a substantially constant distance is maintained to the vehicle in front. In the event of e.g. downhill slopes, or in situations where the vehicle must reduce its actual speed, fuel savings have historically also been made through a reduced request of positive engine torque or with the help of dragging. The reduced request of positive engine torque entails that the force driving in the direction of travel, emitted by the combustion engine via the driving wheels, is reduced, e.g. through reduced fuel injection in the engine, which reduces the fuel consumption.

Dragging means driving the vehicle with a closed driveline, i.e. with the combustion engine connected to the vehicle's driving wheels, while at the same time the fuel injection to the combustion engine is closed. One advantage with this type of measure is that, since the fuel injection to the combustion engine is closed, the combustion engine's consumption is equal to zero. The measure does, however, also entail that the combustion engine will be driven by the vehicle's driving wheels via the driveline, thus achieving so-called "dragging", so that the combustion engine's inertia gives rise to a braking action, i.e. the vehicle is engine-braked.

A reduction of the requested engine torque and dragging does reduce fuel consumption, but this reduction is not always optimized, partly because the reduced engine torque nevertheless often consumes more fuel than necessary, and partly because the dragging also adds an engine-braking of the vehicle, which is not fuel economical.

When the vehicle is driven, the gear selection has a great impact on the fuel consumption, since the engine speed is directly dependent on this gear selection. Thus, the fuel consumption for an actual speed $v_{act}$ is generally lower for a higher gear compared to a lower gear. An upshift means that the forces that act against the vehicle's movement are reduced, since the force for the engine friction $F_{eng}$ becomes smaller as the engine speed is reduced. Thus an upshift may reduce fuel consumption, also since the resistance against the vehicle is reduced.

There are therefore cruise controls comprising a function trying to achieve that as high a gear as possible is used, at the same time as an actual speed $v_{act}$ for the vehicle within a speed interval $v_{min}$-$v_{max}$ is obtained.

In this document, an upshift means that a higher potential gear in the gearbox is selected, where this higher gear is physical, i.e. it constitutes one of the gears in the gearbox. This higher gear also means that the engine works at a lower engine speed if the actual speed $v_{act}$ is maintained.

Another way of reducing fuel consumption is to let the vehicle coast, as described below, by either using a neutral gear in the gearbox or opening the clutch. By using coasting, even lower fuel consumption is achieved than with dragging, since engine-braking is eliminated while the engine speed is reduced to a minimum. Coasting may be carried out with the engine working or switched off.

Coasting here means that the vehicle's engine is disconnected from the engine's driving wheels, so that the driveline is opened. This disconnection of the driving wheels from the engine, also called opening of the driveline, may be achieved by putting the gearbox in a neutral gear or by opening the clutch. In other words, during coasting essentially no power is transmitted from the engine to the driving wheels through the gearbox. In this document, the concept of coasting also includes that one of several engines in a vehicle, e.g. in a hybrid vehicle, are disconnected from the driving wheels. For example, the concept of coasting comprises a manner of driving in a hybrid vehicle, where a combustion engine is disconnected from the driving wheels and where an electric engine then still may transmit power to the driving wheels.

Coasting means that the forces that act against the vehicle's movement are significantly reduced, since the force for the engine friction $F_{eng}$ then shrinks to a value substantially equal to zero (0). Therefore, coasting may significantly reduce fuel consumption through this reduction of the resistance against the vehicle. In certain cases of coasting idling fuel must, however, be provided to the engine so that it does not stop, whereas the engine may be permitted to stop in other cases.

This means, that from a fuel perspective it is often more advantageous to drive the vehicle with an open driveline, i.e. coasting, than with dragging, i.e. when the driveline is closed while simultaneously the fuel injection to the engine is closed. The reason for this is that the limited amount of fuel, which is required to keep the combustion engine in operation when the combustion engine is disconnected, is compensated for by the fact that the vehicle may continue with a disconnected combustion engine a longer distance, e.g. after passing a downhill slope. This depends among others on the vehicle achieving a higher speed on e.g. the downhill slope, when driven with a disconnected combustion engine, compared to driving the vehicle with a closed driveline without fuel injection. There are also variants of coasting for which the combustion engine is switched off during coasting, no fuel injection being required.

In addition, when coasting, the force which counteracts the vehicle being driven will be lower when the vehicle's combustion engine is disconnected from the driving shaft, since there is no engine-braking force that counteracts the progress of the vehicle. This means that the vehicle will retard more slowly, e.g. when the vehicle reaches the end of a downhill slope, which in turn means that coasting may often be used over a relatively long distance after e.g. the end of a downhill slope. Thus a significant reduction in fuel consumption is obtained.

There are therefore cruise controls comprising a function trying to achieve that coasting is used, if it is possible to obtain an actual speed $v_{act}$ within a speed interval $v_{min}$-$v_{max}$ thereby. Such cruise controls may increase the actual speed $v_{act}$ before road sections for which coasting is expected to be possible.

SUMMARY OF THE INVENTION

As described above, there are a number of cruise control functions defined, aiming aim to reduce the fuel consumption and/or to improve the driveability of the vehicle by varying the vehicle's actual speed $v_{act}$ within a predetermined speed interval between a lowest permitted speed $v_{min}$ and a highest permitted speed $v_{max}$, $v_{min}$-$v_{max}$.

The lowest permitted speed $v_{min}$ may be related to one or several of a current actual speed $v_{act}$ for the vehicle, a transmission mode, and information about said road section ahead.

The highest permitted speed $v_{max}$ may be related to a set speed $v_{set}$ for the cruise control, or to the vehicle's current speed, set by the driver directly, and/or to one or several of a transmission mode, a constant speed-braking speed, $v_{dhsc}$ for the vehicle, a distance to at least one vehicle in front, speed limits, and a curvature for the road section.

Authorities may also decide on a maximum speed limit $v_{legal\_max}$ which a type of vehicle, such as a truck or a bus, may never exceed. For example, authorities in Europe have decided that certain types of vehicles, such as heavy goods trucks and buses, may not be driven faster than 90 km/h, so that this maximum speed limit $v_{legal\_max}$ set by the authorities in Europe has a value of 90 km/h, $v_{legal\_max}$=90 km/h.

In order to avoid that this maximum speed limit $v_{legal\_max}$ set by the authorities is exceeded, vehicles may be equipped with a speed limiter which prevents the vehicle being actively controlled to exceed a predetermined speed limit $v_{speed\_limiter}$ for the speed limiter. This predetermined speed $v_{speed\_limiter}$ for the speed limiter is often set by the vehicle manufacturer at a value which is equal to or lower than the maximum speed limit $v_{legal\_max}$ set by the authorities. In Europe, the predetermined speed $v_{speed\_limiter}$ for the speed limiter may thus have a value lower than or equal to 90 km/h, $v_{legal\_max}$≤90 km/h.

One advantage with this restriction of the vehicle's and/or the driver's freedom to control the actual speed $v_{act}$ is that the vehicle will certainly be travelling within the speed limits permitted by the authorities, i.e. that the actual speed does not exceed the maximum speed limit $v_{legal\_max}$, $v_{act}$≤$v_{legal,max}$ set by the authorities, except if the vehicle accelerates without being actively controlled to accelerate, e.g. if the vehicle accelerates by virtue of its own weight on a downhill slope.

An easy way of saving fuel is to drive slower. For this reason, many haulers do not want their vehicles to be able to drive faster than a predetermined speed, which is often lower than the maximum speed limit $v_{legal\_max}$ set by the authorities. For example, it is common in Europe that the speed limiter's predetermined speed $v_{speed\_limiter}$ is set at a value corresponding to $v_{speed\_limiter}$=85 km/h.

This lower value for the predetermined speed $v_{speed\_limiter}$ thus means that the speed limiter prevents the vehicle from being actively controlled to exceed the predetermined speed $v_{speed\_limiter}$. Here, the driver of the vehicle may thus not achieve, through input of a set speed $v_{set}$ for a cruise control, an input using an accelerator pedal or a hand throttle device, or an input of a directly or indirectly requested engine torque, that the vehicle's actual speed $v_{act}$ exceeds the predetermined speed $v_{speed\_limiter}$. In other words, e.g. the predetermined speed interval $v_{min}$-$v_{max}$, used by cruise controls, may be limited upwards with the predetermined speed $v_{speed\_limiter}$, i.e. that the maximum permitted speed $v_{max}$ is equal to the predetermined speed $v_{speed\_limiter}$, $v_{max}$=$v_{speed\_limiter}$. One disadvantage with this stricter/lower restriction of the vehicle's and/or the driver's freedom to control the actual speed $v_{act}$ is, however, that this restriction may also have a disadvantageous effect on fuel consumption and/or driveability, since a number of functions with the objective to reduce the fuel consumption and/or improve driveability by varying the actual speed $v_{act}$ are also limited upwards by the predetermined speed $v_{speed\_limiter}$, $v_{max}$=$v_{speed\_limiter}$. Hence, these functions, and thus also the fuel consumption and/or driveability, are not optimized when the vehicle's actual speed $v_{act}$ is limited in this way.

It is one objective of the present invention to further reduce the fuel consumption and/or improve the driveability of the vehicle.

Through the use of the present invention, the automatic control of the actual speed $v_{act}$ may be carried out, so that the fuel consumption is reduced and/or driveability is improved and/or understanding of the function is increased. This is possible since the actual speed $v_{act}$ according to the invention, during automatic control, e.g. with the use of a cruise control, may be varied within a larger interval than was previously possible. This extended speed interval is limited, when it is at its largest, by the maximum speed limit $v_{legal\_max}$ set by the authorities, i.e. the speed interval may at a maximum be $v_{min}$-$v_{legal\_max}$. At the same time, the automatic control controls the vehicle's actual speed $v_{act}$ very well, which means that active breaches of the maximum speed limit $v_{legal\_max}$ set by the authorities may be avoided despite the larger interval.

According to one embodiment of the present invention, the maximum speed limit $v_{legal\_max}$ used by the invention has an infinite value for those areas, e.g. countries, where the authorities have not determined a specific value for the maximum speed limit $v_{legal\_max}$.

In other words, actual speeds $v_{act}$ may here, during automatic control, also be used within a speed interval limited downwards by the predetermined speed $v_{speed\_limiter\_man}$ for manual control and limited upwards by the predetermined speed $v_{speed\_limiter\_aut}$ for automatic control $v_{speed\_limiter\_man}$<$v_{act}$≤$v_{speed\_limiter\_aut}$. This speed interval $v_{speed\_limiter\_man}$<$v_{act}$≤$v_{speed\_limiter\_aut}$ may not be used for manual control according to the present invention. Previously it has not been possible to use this speed interval $v_{speed\_limiter\_man}$<$v_{act}$≤$v_{speed\_limiter\_aut}$ for automatic control according to prior art, where one and the same predetermined speed $v_{speed\_limiter}$ for the speed limiter has been used for both manual and automatic control.

Thus, through the use of the present invention, an extended speed interval $v_{min}$≤$v_{act}$≤$v_{speed\_limiter\_aut}$ is obtained, within which the actual vehicle speed $v_{act}$ is permitted to vary during automatic control, compared with both manual and automatic control according to prior art technology and also compared with manual control according to the present invention. This extended speed interval is used, according to the invention, to optimize the functions in the automatic control of the actual speed.

By using the present invention, a reduction in fuel consumption may be achieved by, for as long as possible, achieving as low a speed, and thus as fuel-economical a gear selection as possible, and/or for as long as possible to achieve coasting for the vehicle.

Through the use of the present invention, a use of a higher gear may also be extended compared to uses which were possible according to prior art methods. Alternatively, a use of a higher gear may be possible in driving conditions, where prior art methods were not able to use the higher gear.

The objective of making the use of the higher gear and/or extension of the use of the higher gear possible, and/or making coasting and/or extension of the use of coasting possible, is to reduce the engine speed as far as possible for as long as possible, reducing the average engine speed and thus reducing the total fuel consumption.

Through the use of the present invention, driveability of a vehicle with a low value of the predetermined speed $v_{speed\_limiter}$ for the speed limiter for manual control, is improved by permitting the predetermined speed $v_{speed\_limiter}$ being temporarily exceeded, e.g. during overtaking. Similarly, the vehicle may be permitted to keep a higher actual speed before and on uphill slopes, which means that the driver acceptance for a low set, predetermined speed $v_{speed\_limiter}$ increases.

BRIEF SUMMARY OF THE DRAWINGS

The invention will be illustrated in more detail below, along with the enclosed drawings where similar references are used for similar parts, and where.

DETAILED DESCRIPTION OF THE INVENTION

Figure 1:
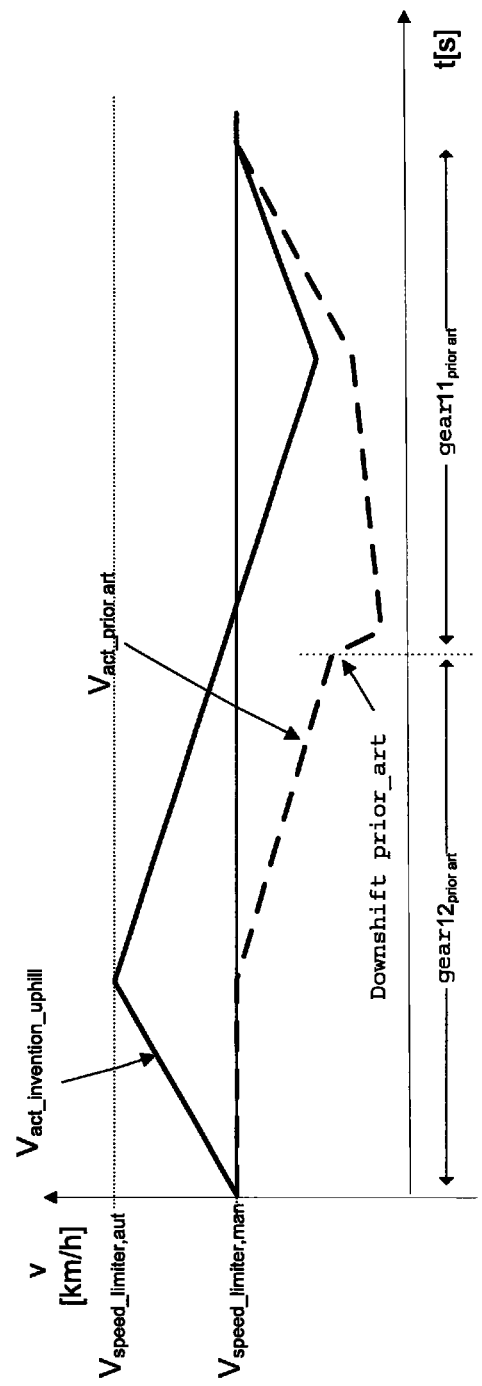
FIG. 1 shows a non-limiting illustration of an embodiment of the present invention.

According to the present invention, a difference between a manual control of the actual speed $v_{act}$, which may use e.g. an accelerator pedal, a hand throttle device, or a device for inputting of a set speed $v_{set}$, and an automatic control of the actual speed $v_{act}$ is made. According to the present invention, the automatic control is permitted to actively control the vehicle's actual speed $v_{act}$ to a higher value than that to which the manual control is permitted to actively control the vehicle's actual speed $v_{act}$.

This may be achieved through the system carrying out the automatic control, e.g. a cruise control which carries out the active control by requesting engine torque from the engine in the vehicle, being permitted to use speeds which are above the predetermined speed $v_{speed\_limiter}$, but below or equal to the maximum speed $v_{legal\_max}$ set by the authorities. Thus, the predetermined speed interval $v_{min}$-$v_{max}$ is limited upwards for the automatic control when it is at its largest by the maximum speed limit $v_{legal\_max}$ set by the authorities, since the highest permitted speed $v_{max}$ is equal to the maximum speed limit $v_{legal\_max}$ set by the authorities, $v_{max}$=$v_{legal\_max}$.

For the manual control, however, the predetermined speed interval $v_{min}$-$v_{max}$ for the cruise control is limited upwards by the predetermined speed $v_{speed\_limiter}$, i.e. the maximum permitted speed $v_{max}$, is equal to the predetermined speed $v_{speed\_limiter}$, $v_{max}$=$v_{speed\_limiter}$, which thus is lower than the maximum speed limit $v_{legal\_max}$ set by the authorities.

Thus, here the automatic control has, at a maximum, a greater predefined speed interval $v_{min}$-$v_{legal\_max}$ than the predefined speed interval $v_{min}$-$v_{speed\_limiter}$ which may be used in the manual control of the vehicle's actual speed $v_{act}$.

This means that the automatic control may be carried out in a more optimal manner than previously, with regard to e.g. fuel consumption and/or driveability and/or understanding of the function, since the actual speed $v_{act}$ may be varied within a greater interval than previously, at its largest limited by the maximum speed limit $v_{legal\_max}$ set by the authorities, $v_{min}$-$v_{legal\_max}$. At the same time, the automatic control controls the vehicle's actual speed $v_{act}$ very well, which means that active breaches of the maximum speed limit $v_{legal\_max}$ set by the authorities may be avoided despite the larger interval.

According to one embodiment of the invention, the automatic control comprises control carried out by cruise controls, which are particularly well adapted for overtaking vehicles in front by identifying information inputted by the driver, such as indications that overtaking is carried out or will be carried out. For example, such a cruise control may, during cruise control driving, identify pressing of an accelerator pedal, an activation of a hand throttle device, or another input made by the driver, such as an overtaking indication, where the greater predefined speed interval $v_{min}$-$v_{legal\_max}$ may be used when overtaking.

The extended (compared to the manual control) speed interval which may be used at the automatic control is defined, according to one embodiment of the present invention, by different predetermined speeds for the speed limiter being determined for the manual control $v_{speed\_limiter\_man}$ and for the automatic control $v_{speed\_limiter\_aut}$. A driver is thus prevented, during manual control of the actual speed $v_{act}$, from actively exceeding a predetermined speed $v_{speed\_limiter\_man}$ for the speed limiter, which has been determined for manual control.

Similarly, the automatic control of the actual speed $v_{act}$ is, e.g. through the use of a cruise control function, prevented from actively exceeding a predetermined speed $v_{speed\_limiter\_aut}$ for the speed limiter, which has been determined for automatic control. The predetermined speed $v_{speed\_limiter\_aut}$ for automatic control is here higher than the predetermined speed $v_{speed\_limiter\_man}$ for manual control, but is lower than or equal to the maximum speed limit $v_{legal\_max}$ set by the authorities; $v_{speed\_limiter\_man} < v_{speed\_limiter\_aut} \le v_{legal\_max}$.

According to one embodiment, the maximum speed permitted $v_{max}$ for the actual speed $v_{act}$, which is used by a cruise control, is equal to this speed limit for automatic control $v_{speed\_limiter\_aut}$; $v_{max}$=$v_{speed\_limiter\_aut}$.

In other words, here actual speeds $v_{act}$ may, during automatic control, also be used within a speed interval, limited downwards by the predetermined speed $v_{speed\_limiter\_man}$ for manual control and limited upwards by the predetermined speed $v_{speed\_limiter\_aut}$ for automatic control $v_{speed\_limiter\_aut}$, $v_{speed\_limiter\_man} < v_{act} \le v_{speed\_limiter\_aut}$. This speed interval $v_{speed\_limiter\_man} < v_{act} \le v_{speed\_limiter\_aut}$ may not be used for manual control according to the present invention. It has not been possible to use this speed interval $v_{speed\_limiter\_man} < v_{act} \le v_{speed\_limiter\_aut}$ for automatic control according to prior art technology, where one and the same predetermined speed $v_{speed\_limiter}$ for the speed limiter has been used both for manual and automatic control.

Thus, through the use of the present invention, an extended speed interval $v_{min} < v_{act} \le v_{speed\_limiter\_aut}$ is obtained, within which the actual vehicle speed $v_{act}$ is permitted to vary during automatic control, compared to both manual and automatic control according to prior art technology, and also compared to manual control according to the present invention.

According to one embodiment of the present invention, the automatic control uses a cruise control, e.g. a cruise control which bases its decisions on information, such as topographical information for road sections ahead, which before an uphill slope increases the actual speed $v_{act}$ compared to an actual speed $v_{act}$ which would have resulted from the manual control. This is achieved according to the embodiment through actual speeds $v_{act}$ within the speed interval, which are limited by the predetermined speed for manual control $v_{speed\_limiter\_man}$ and the predetermined speed for automatic control $v_{speed\_limiter\_aut}$ being used for automatic control $v_{speed\_limiter\_man} < v_{act} \le v_{speed\_limiter\_aut}$. In addition, those actual speeds $v_{act}$ are used, which may be used for manual control, meaning that the automatic control may use an extended speed interval $v_{min} \le v_{act} \le v_{speed\_limiter\_aut}$ where the actual speed $v_{act}$ is controlled. Thus the increased actual speed $v_{act}$ may be used before the uphill slope, which means that a downshift may be avoided, or delayed, during the uphill slope, so that the fuel consumption may be reduced since the use of the higher gear is more fuel-efficient than a use of the lower gear would be.

FIG. 1 shows a non-limiting example of this embodiment, wherein the vehicle's actual speed $v_{act}$ is permitted to increase over the predetermined speed for manual control $v_{speed\_limiter\_man}$ in the event of an uphill slope where the automatic control is used. Thus an increased actual speed $v_{act\_invention\_uphill}$ is obtained (solid curve), which increases up to the predetermined speed for automatic control $v_{speed\_limiter\_aut}$. Through the use of the increased actual speed $v_{act\_invention\_uphill}$, a downshift may be avoided and the vehicle may traverse the uphill slope in the same gear, gear 12 according to the example, as it used before the uphill slope. Thus a downshift may be avoided through the entire road section, because the automatic control is permitted to use speeds up to the higher predetermined speed for automatic control $v_{speed\_limiter\_aut}$, so that gear 12 may be used throughout the entire road section. With prior art solutions the actual speed $v_{act}$ may not exceed the predetermined speed for manual control $v_{speed\_limiter\_man}$, which means that the actual speed $v_{act,priorart}$ (dashed curve) remains at the set speed $v_{set}$, corresponding to the predetermined speed for manual control $v_{speed\_limiter\_man}$, until it starts to reduce due to the uphill slope. With prior art, at a certain actual speed and/or a certain engine speed, a downshift (Downshift prior_art) would take place, according to this example, from gear 12 to gear 11.

Thus a downshift may be avoided with the use of this embodiment of the invention, achieving a lower fuel consumption or a shorter driving time. In certain driving conditions both a shorter driving time and a lower fuel consumption are achieved through the use of the invention.

According to one embodiment of the present invention, the automatic control uses a cruise control, which, ahead of a road section where coasting may be deemed to be applicable, increases the actual speed $v_{act}$ compared to an actual speed $v_{act}$ which would have resulted from the manual control. This is achieved through also using, in addition to the use of actual speeds $v_{act}$ which may be used for manual control, actual speeds $v_{act}$ within a speed interval limited by the predetermined speed for manual control $v_{speed\_limiter\_man}$ and the predetermined speed for automatic control $v_{speed\_limiter\_aut}$; $v_{speed\_limiter\_man} < v_{act} \leq v_{speed\_limiter\_aut}$. Thus, the automatic control may use the extended speed interval $v_{min} \leq v_{act} \leq v_{speed\_limiter\_aut}$ where the actual speed $v_{act}$ is controlled, meaning that coasting may be facilitated and/or extended for the road section, so that fuel savings are achieved.

Figure 2:
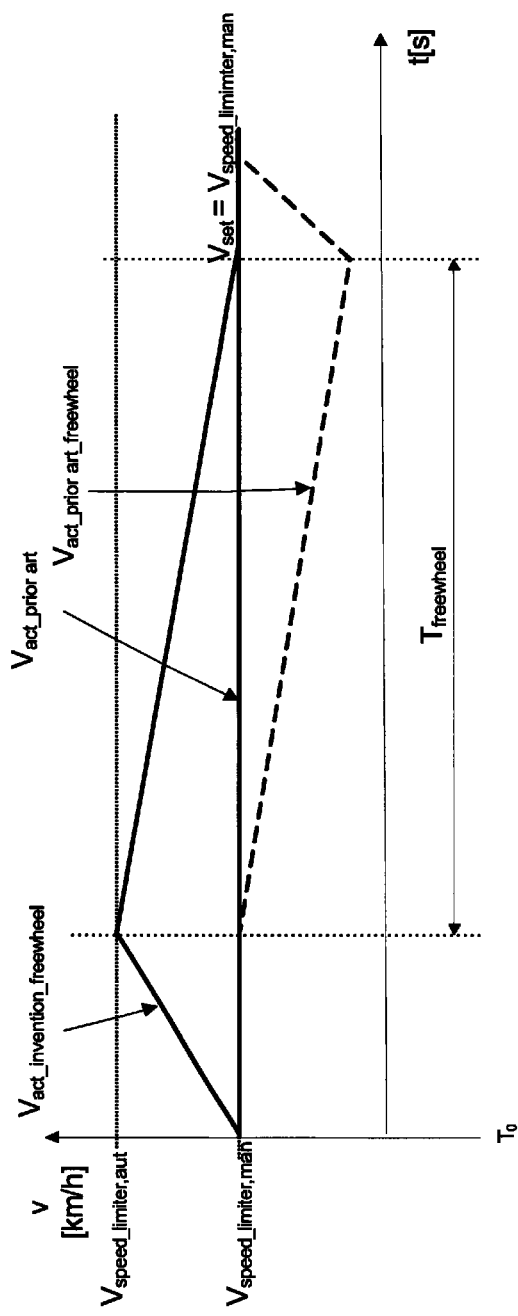
FIG. 2 shows a non-limiting illustration of an embodiment of the present invention.

FIG. 2 shows a non-limiting example of this embodiment, where the vehicle's actual speed $v_{act}$ is permitted to increase above the predetermined speed for manual control $v_{speed\_limiter\_man}$ when the automatic control is used. Thus an increased actual speed $v_{act\_invention\_freewheel}$ is achieved (a solid, initially rising and subsequently falling curve), increasing up to the predetermined speed for automatic control $v_{speed\_limiter\_aut}$, following which fuel-saving coasting may be used. With prior art solutions, the actual speed $v_{act}$ may not exceed the predetermined speed for manual control $v_{speed\_limiter\_man}$, meaning that the actual speed $v_{act,priorart}$ remains unchanged at the set speed $v_{set}$, corresponding to the predetermined speed for manual control $v_{speed\_limiter\_man}$ if no coasting occurs. If coasting occurs with prior art solutions, the actual speed falls $v_{act,priorart\_freewheel}$ relatively substantially below the predetermined speed for manual control $v_{speed\_limiter\_man}$.

As displayed in FIG. 1, through the use of the present invention a higher average speed is obtained, at the same time as fuel-saving coasting may be used. In addition, cruise control and coasting are features which may be understood intuitively and accepted by a driver of the vehicle, since the vehicle's actual speed remains at a high level despite the coasting. It should be noted that the actual speed $v_{act,priorart\_freewheel}$ resulting from prior art solutions is experienced by a driver as though it makes the vehicle's progress so slow that the coasting function risks to be inactivated by the driver. The present invention thus provides an overall reduced fuel consumption through an increased use of the coasting function.

According to one embodiment of the present invention, the automatic control uses a cruise control which, before a road section where a higher gear than the gear used before the road section may be deemed to be applicable, increases the vehicle's actual speed $v_{act}$ compared to the actual speed $v_{act}$ which would have resulted from the manual control. This is achieved because the automatic control also using, in addition to the use of actual speeds $v_{act}$ which may be used at the manual control, actual speeds $v_{act}$ within a speed interval limited by the predetermined speed for manual control $v_{speed\_limiter\_man}$ and the predetermined speed for automatic control $v_{speed\_limiter\_aut}$; $v_{speed\_limiter\_man} < v_{act} \leq v_{speed\_limiter\_aut}$. Thus, the automatic control may use the extended speed interval $v_{min} \leq v_{act} \leq v_{speed\_limiter\_aut}$ where the actual speed $v_{act}$ is controlled, meaning that an upshift may be facilitated during the road section. The upshift provides a lower engine speed and thus a lower fuel consumption, as described above.

As mentioned above, the maximum speed limit $v_{legal\_max}$ predetermined by the authorities may be related to a vehicle type. Thus, the vehicle type "trucks" may here have a predetermined value for this speed limit $v_{legal\_max}$, while e.g. the vehicle type "buses" may have the same or another value for this speed limit $v_{legal\_max}$.

The predetermined speed $v_{speed\_limiter\_man}$ for manual control and/or the predetermined speed $v_{speed\_limiter\_aut}$ for automatic control is, according to one embodiment, related to a specific vehicle. Thus, e.g. different examples of the vehicle type "trucks" may have different predetermined values for these speed limits $v_{speed\_limiter\_man}$, $v_{speed\_limiter\_aut}$.

At least one of the predetermined speed $v_{speed\_limiter\_man}$ for manual control and the predetermined speed $v_{speed\_limiter\_aut}$ for automatic control may also be related to a driving mode for the said vehicle. Thus, e.g. the predetermined speed $v_{speed\_limiter\_man}$ may, for manual control, be given a lower value for the driving mode "ECO" than for the driving mode "POWER".

According to one embodiment of the present invention, the maximum speed limit $v_{legal\_max}$ set by the authorities is related to a speed limit for a road section. Here, the maximum speed limit $v_{legal\_max}$ set by the authorities may thus vary along a driving distance that passes through several different road sections with different speed limits.

The predetermined speed $v_{speed\_limiter\_man}$ for manual control and the predetermined speed $v_{speed\_limiter\_aut}$ for automatic control, which control the speed limiter in the vehicle, may not be impacted by a driver of the vehicle. Thus, the driver may not actively exceed the predetermined speeds $v_{speed\_limiter\_man}$ $v_{speed\_limiter\_aut}$ by changing the vehicle's settings for the predetermined speeds $v_{speed\_limiter\_man}$ $v_{speed\_limiter\_aut}$. This may only be done by the vehicle manufacturer and/or during service. However, the predetermined speeds $v_{speed\_limiter\_man}$ $v_{speed\_limiter\_aut}$ may never be given values exceeding the maximum speed limit $v_{legal\_max}$ set by the authorities.

Figure 3:
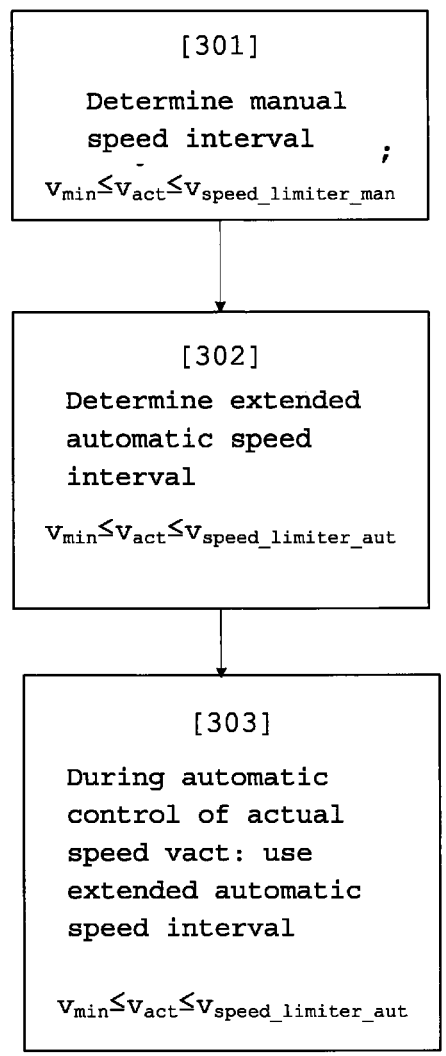
FIG. 3 shows a flow chart for a method according to one embodiment of the present the invention.

FIG. 3 shows a flow chart for one embodiment of the present invention.

At a first step 301 of the method according to the embodiment, a speed interval is determined, within which a manual control of the vehicle's actual speed may vary the actual speed $v_{act}$, this speed interval being limited downwards by the above-mentioned minimum permitted speed and being limited upwards by the above-mentioned predetermined speed $v_{speed\_limiter\_man}$ for manual control $v_{min} \leq v_{act} \leq v_{speed\_limiter\_man}$.

At a second step 302 of the method according to the embodiment, an extended speed interval is determined, within which an automatic control of the vehicle's actual speed, e.g. through cruise control, may vary the actual speed $v_{act}$, this speed interval being limited downwards by the above-mentioned minimum permitted speed and being limited upwards by the above-mentioned predetermined speed $v_{speed\_limiter\_aut}$ for automatic control $v_{min} \leq v_{act} \leq v_{speed\_limiter\_aut}$ and where $v_{speed\_limiter\_man} < v_{speed\_limiter\_aut} \leq v_{legal\_max}$.

At a third step 303 of the method, this extended speed interval $v_{min} \leq v_{act} \leq v_{speed\_limiter\_aut}$ is used in order to, during the automatic control of the actual speed $v_{act}$, achieve optimizations of the automatic control concerning e.g. driveability, fuel consumption and/or comfort in the vehicle.

A person skilled in the art will realize that a method for the control of an actual speed $v_{act}$ for a vehicle, according to the present invention, may also be implemented in a computer program, which when executed in a computer will cause the computer to carry out the method. The computer program usually consists of a part of a computer program product 403, where the computer program product comprises a suitable digital storage medium on which the computer program is stored. Said computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
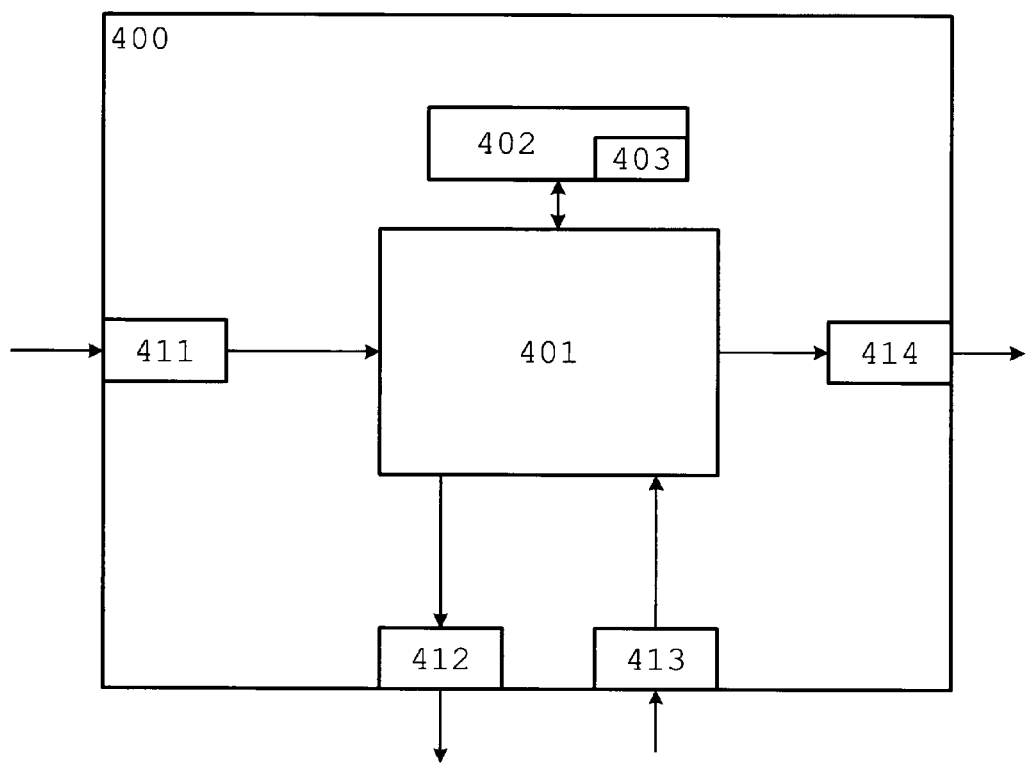
FIG. 4 shows a control device according to the present invention.

FIG. 4 schematically shows a control device 400.

The control device 400 comprises a calculation device 401, which may consist of essentially a suitable type of processor or microcomputer, e.g. a circuit for digital signal processing (Digital Signal Processor, DSP), or a circuit with a specific function (Application Specific Integrated Circuit, ASIC). The calculation device 401 is connected to a memory unit 402 installed in the control device 400, providing the calculation device 401 with e.g. the stored program code and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals, respectively. These input and output signals may contain wave shapes, pulses, or other attributes, which may be detected as information by the devices 411, 413 for the receipt of input signals and may be converted into signals that may be processed by the calculation device 401. These signals are then provided to the calculation device 401. The devices 412, 414 for sending output signals are arranged to convert the calculation results from the calculation device 401 into output signals for transmission to other parts of the vehicle's control system and/or to the component(s) for which the signals are intended, e.g. to a motor control system and/or a control system for gear shifting and/or coasting.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection. A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment displayed, is implemented in the control device 400. The invention may, however, also be implemented wholly or partly in one or several other control devices already existing in the vehicle or in a control device dedicated to the present invention.

According to one aspect of the present invention a system is provided for the regulation of an actual speed $v_{act}$ for a vehicle, where the system is arranged to be able to carry out the control, based on a manual control of the actual speed $v_{act}$ or based on an automatic control of the actual speed $v_{act}$. According to the present invention, an automatic control device 511 is arranged to permit that the automatic control may actively control the actual speed $v_{act}$ to a higher value than what a manual control device 512 is arranged to permit the manual control to actively control the actual speed $v_{act}$ to.

According to one embodiment of the invention, the manual control device 512 is arranged to prevent a driver from actively exceeding a predetermined speed $v_{speed\_limiter\_man}$ for a speed limiter during manual control, when the manual control is used to control the actual speed $v_{act}$. In addition, the automatic control device 511 is arranged to prevent the automatic control of the actual speed $v_{act}$ from actively exceeding a predetermined speed $v_{speed\_limiter\_aut}$ for a speed limiter during automatic control. As described above, here this predetermined speed $v_{speed\_limiter\_aut}$ for automatic control is higher than the predetermined speed $v_{speed\_limiter\_man}$ for manual control, but lower than or equal to a maximum speed limit determined by an authority $v_{legal\_max}$; $v_{speed\_limiter\_man} < v_{speed\_limiter\_aut} \leq v_{legal\_max}$.

Figure 5:
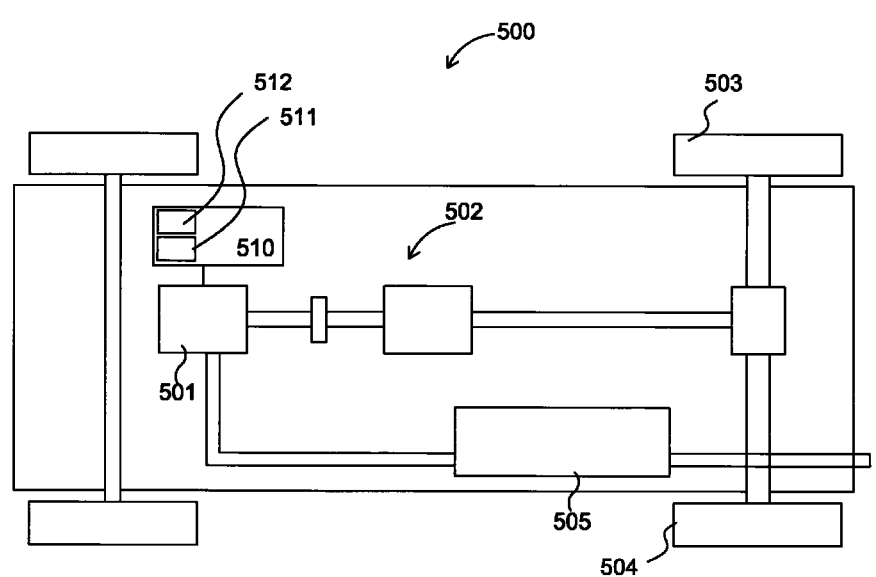
FIG. 5 shows a vehicle according to the present invention.

A person skilled in the art will also realize that the above system may be modified according to the different embodiments of the method according to the invention. In addition, the invention pertains, according to one aspect, to a motor vehicle 500 which is schematically shown in FIG. 5. The motor vehicle 500 may e.g. be a passenger car, a truck or a bus, comprising an engine 501, which via a driveline 502 drives driving wheels 503, 504, an exhaust treatment system 505, and at least one system for the control of an actual speed $v_{act}$, according to the invention. As described above, the system according to the invention may be implemented in a control device 510, which corresponds to the above-mentioned control device 400 in FIG. 4, and which is arranged to control the function in the engine 501. The control device 510 comprises the automatic control 511 and manual control devices 512 described above, where the automatic control device 511 may permit the automatic control to actively control the actual speed $v_{act}$ to a higher value than the value which the manual control device 512 allows the manual control to actively control the actual speed $v_{act}$ to.

The present invention is not limited to the embodiments of the invention described above, but pertains to and comprises all embodiments within the protected scope of the enclosed independent claims.

The invention claimed is:

1. A computer implemented method for the control of an actual speed for a vehicle, wherein said control may be carried out based on a manual control of said actual speed or based on an automatic control of said actual speed, wherein said method comprises:
preventing a driver of said vehicle, during said manual control of said actual speed, from actively exceeding a predetermined speed for a speed limiter for manual control, wherein said predetermined speed for manual control is related to a driving mode for said vehicle; and
preventing automatic control of said actual speed of the vehicle from actively exceeding a predetermined speed for a speed limiter for automatic control, said predetermined speed for automatic control is higher than said predetermined speed for manual control and lower than or equal to a maximum speed limit set by an authority, such that, during automatic control, the actual speed of the vehicle may be controlled to a higher value than the value of the predetermined speed for the speed limiter used for manual control.

2. The method according to claim 1, wherein said predetermined speed for manual control and said predetermined speed for automatic control are not impacted by a driver of said vehicle.

3. The method according to claim 1, wherein a maximum permitted speed for said actual speed is equal to said speed limit for automatic control and said maximum permitted speed is used by a cruise control during said control of said actual speed.

4. The method according to claim 1, wherein said automatic control uses a cruise control, which before an uphill slope increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

5. The method according to claim 4, wherein said increased actual speed entails that a down shift may be avoided or delayed for said uphill slope.

6. The method according claim 1, wherein said automatic control uses a cruise control which, before a road section where coasting may be deemed to be applicable, increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

7. The method according to claim 6, wherein said increased actual speed means that said coasting may be facilitated and/or extended for said road section.

8. The method according to claim 1, wherein said automatic control uses a cruise control which, before a road section where a higher gear than a gear used before a road section may be deemed to be applicable, increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

9. The method according to claim 8, wherein said increased actual speed means that an upshift may be facilitated for said road section.

10. The method according to claim 1, wherein the active control of said manually controlled actual speed is based on at least one from the group of:
a set speed for a cruise control in said vehicle;
an input from a driver obtained by an accelerator pedal;
an input from a driver obtained by a hand throttle device;
an engine torque requested directly by a driver; and
an engine torque requested indirectly by a driver.

11. The method according to claim 1, wherein the active control of said automatically controlled actual speed is based on an engine torque requested by a cruise control.

12. The method according to claim 1, wherein said automatic control comprises the use of a cruise control, wherein said cruise control is at least one from the group of:
an economic cruise control;
a cruise control which uses topographical data to obtain information for a road section ahead;
a cruise control which uses a radar to obtain information about a vehicle ahead;
a cruise control which uses a camera to obtain information about a vehicle ahead;
a driveability-improving cruise control;
a cruise control which uses coasting; and
a cruise control adapted for overtaking, identified through input by a driver of said vehicle.

13. A computer program product located on a non-transitory computer readable medium, where the computer program product is used for control of an actual speed for a vehicle, wherein said control may be carried out based on a manual control of said actual speed or based on an automatic control of said actual speed, wherein said computer program product comprising instructions, causing a computing device to perform the operations of
allowing the automatic control to actively control said actual speed to a higher value than the value to which the manual control is permitted to actively control said actual speed to;
preventing a driver of said vehicle during said manual control of said actual speed from actively exceeding a predetermined speed for a speed limiter for manual control; and
preventing said automatic control of said actual speed from actively exceeding a predetermined speed for a speed limiter for automatic control, said predetermined speed for automatic control being higher than said predetermined speed for manual control,
wherein said predetermined speed for automatic control is lower than or equal to a maximum speed limit set by an authority, and in that said predetermined speed for manual control is related to a driving mode for said vehicle.

14. The computer program product according to claim 13 further comprising instructions for operation by a computing device to cause said computing device to:
before an uphill slope, increasing said actual speed compared to an actual speed which would have resulted from manual control, wherein increasing said actual speed may use an actual speed which may also be used for manual control or use an actual speed that is within a speed interval that is between said predetermined speed for manual control and said predetermined speed for automatic control.

15. The computer program product according to claim 13 further comprising instructions for operation by a computing device to cause said computing device to:

before a road section where coasting may be deemed to be applicable, increasing said actual speed compared to an actual speed which would have resulted from manual control, wherein increasing said actual speed may use an actual speed which may also be used for manual control or use an actual speed that is within a speed interval that is between said predetermined speed for manual control and said predetermined speed for automatic control.

16. The computer program product according to claim 13 further comprising instructions for operation by a computing device to cause said computing device to:

before a road section where a higher gear than a gear used before a road section may be deemed to be applicable, increasing said actual speed compared to an actual speed which would have resulted from manual control, wherein increasing said actual speed may use an actual speed which may also be used for manual control or use an actual speed that is within a speed interval that is between said predetermined speed for manual control and said predetermined speed for automatic control.

17. A system for the control of an actual speed for a vehicle, wherein said system is configured to carry out said control based on a manual control of said actual speed or based on an automatic control of said actual speed, said system comprising:

a manual control device; and an automatic control device configured to actively control said actual speed to a higher value than the value the manual control device is configured to permit manual control to actively control said actual speed to, wherein, said manual control device is configured to prevent a driver of said vehicle, during said manual control of said actual speed, from actively exceeding a predetermined speed for a speed limiter for manual control; and said automatic control device is configured to prevent said automatic control of said actual speed from actively exceeding a predetermined speed for a speed limiter for automatic control, said predetermined speed for automatic control being higher than said predetermined speed for manual control, but being lower than or equal to a speed limit set by an authority; and said manual control device being adapted to relate the predetermined speed for manual control to a driving mode for said vehicle.

18. The system according to claim 17, wherein said automatic control device uses a cruise control, which before an uphill slope increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

19. The system according claim 17, wherein said automatic control device uses a cruise control which, before a road section where coasting may be deemed to be applicable, increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

20. The system according to claim 17, wherein said automatic control uses a cruise control which, before a road section where a higher gear than a gear used before a road section may be deemed to be applicable, increases said actual speed compared to an actual speed which would have resulted from said manual control, wherein said automatic control may use an actual speed which may also be used in said manual control or use an actual speed that is within a speed interval that is between said predetermined speed for manual control and said predetermined speed for automatic control.

* * * * *